J. W. JONES.
SPRING MOTOR.
APPLICATION FILED JUNE 23, 1920.
1,406,650.
Patented Feb. 14, 1922.
2 SHEETS—SHEET 1.
Fig.1.
Fig.5.
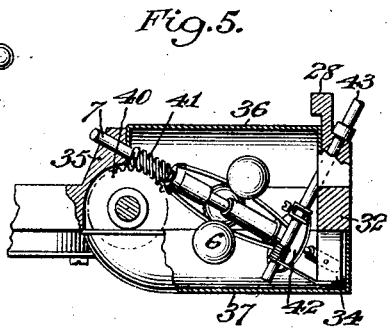
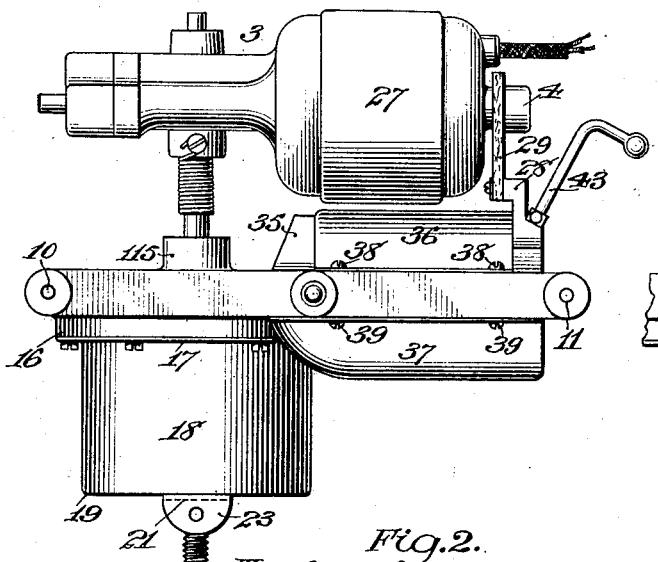
Fig.2.  Fig.3.
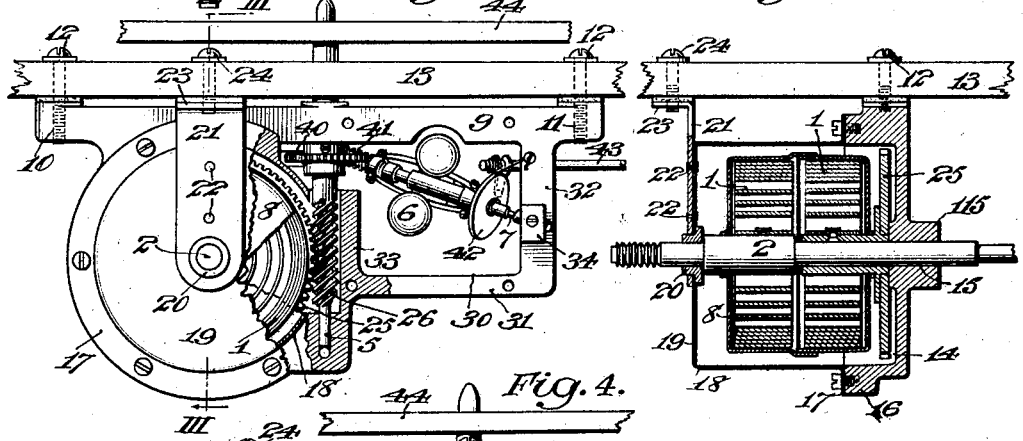
Fig.4.
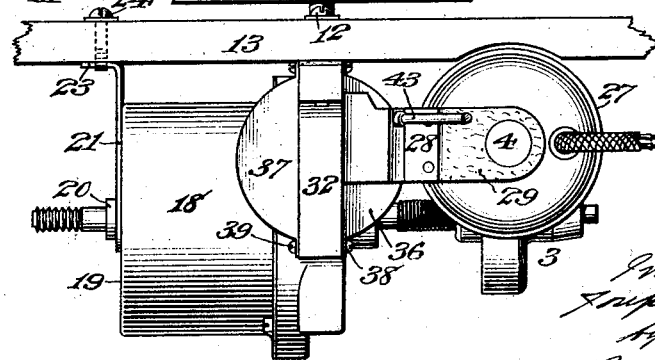
Inventor
Joseph W. Jones
By his attorneys
Brown & Seward

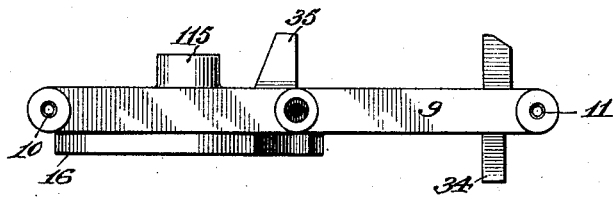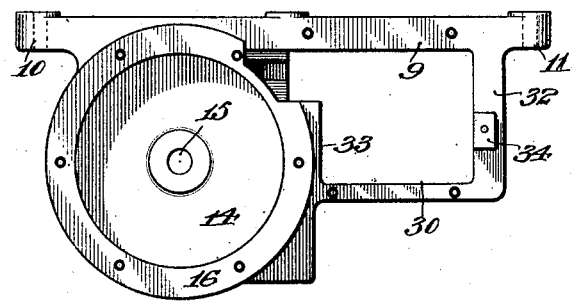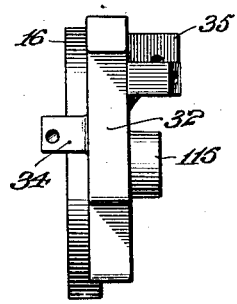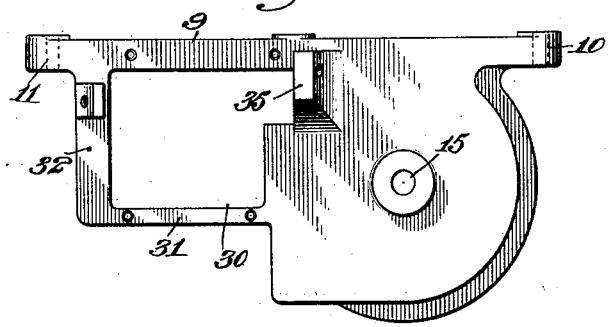

UNITED STATES PATENT OFFICE.

JOSEPH W. JONES, OF NEW YORK, N. Y.

SPRING MOTOR.

1,406,650.  Specification of Letters Patent.  Patented Feb. 14, 1922.

Application filed June 23, 1920. Serial No. 391,173.

*To all whom it may concern:*

Be it known that I, JOSEPH W. JONES, a citizen of the United States, and resident of the borough of Manhattan, in the city and State of New York, have invented a new and useful Improvement in Spring Motors, of which the following is a specification.

The object of my invention is to provide certain improvements in the construction, form and arrangement of the several parts of a spring motor, especially designed for talking machines, whereby the structure of the motor is materially simplified, its working parts completely enclosed and balanced, and its skeleton supporting frame secured in a pendent position at three points to its support, provision being made for permitting certain of the parts to run in a bath of oil.

My invention also includes a spring motor provided with an electric winding motor, the spring motor being located upon one side of the supporting frame and the electric motor upon the other side of the frame, the shafts of the two motors being disposed horizontally at right angles to each other, the electric motor being mounted on the spring motor shaft, a yielding retainer being provided for the free end of the electric motor.

My invention also includes a governor for the spring motor driven shaft, in the present instance, the turn table shaft, which governor is mounted in the supporting frame between the two motors.

My invention also includes a removable housing for the governor and a removable oil containing casing for the spring motor, said spring motor casing being provided with a bracket arm and a shaft bearing for the spring motor shaft, said bracket arm forming one point of a three point attachment for the motor frame, the other two points being located at the opposite ends of the top member of the said frame.

A practical embodiment of my invention is represented in the accompanying drawings, in which, Fig. 1 represents the device in top plan.

Fig. 2 represents the device in side elevation, partly in section, one of the housing members for the governor being removed.

Fig. 3 represents a vertical section taken in the plane of the line III—III of Fig. 2.

Fig. 4 represents an end view of the device.

Fig. 5 represents a detail horizontal section through the governor.

Fig. 6 represents the motor frame in top plan.

Fig. 7 represents the motor frame in side elevation, looking from one direction.

Fig. 8 represents the motor frame in side elevation, looking from the opposite direction.

Fig. 9 represents the frame in end elevation.

The spring motor springs are denoted by 1 and the horizontally arranged spring motor shaft by 2. The electric winding motor is denoted by 3 and its horizontally arranged shaft by 4. The vertically disposed spring motor driven shaft, in the present instance, the turn table shaft, is denoted by 5. The governor is denoted by 6, and its inclined shaft by 7. The spring motor spring barrel is denoted by 8.

The vertically disposed integral spring motor frame for supporting the several parts is of skeleton form and comprises a horizontally disposed top member 9 having holes 10 and 11 at its opposite ends for receiving screws or other fastening devices 12 for securing the frame to the underside of a suitable support 13. Below the horizontal member 9, the frame is provided with a circular recess 14 having its peripheral wall concentric with a hole 15 through which the spring motor shaft 2 projects. The hole 15 extends through a hub 115 which projects from the other side of the frame for giving an extended bearing at this point for the said spring motor shaft 2. An annular flange 16 surrounds this recess 14, to the face of which flange the annular flange 17 of a cup-shaped casing 18 is removably secured. The outer end 19 of this casing is provided with a hole in alinement with the hole 15, said hole being filled by a collar 20, carried by a vertical bracket arm 21 riveted or otherwise secured at 22 to the casing. This collar 20 forms another bearing for the spring motor shaft 2. The upper end of this bracket arm 21 is extended laterally as shown at 23 and it has a hole for receiving a screw or other fastening device 24 for securing the bracket arm to the underside of the support 13 at a point offset from the screws 12 which engage the opposite ends of the upper horizontal member 9 of the frame, thus forming the three point suspension for the motor.

The spring motor gear 25 is located within the circular recess 14 of the frame, which gear meshes with a worm 26 on the turn table shaft 5 for driving the same.

The casing forms an oil containing chamber for the spring motor, and the driving connection between the spring motor shaft and turn table shaft.

The electric motor casing 27 is mounted on the spring motor shaft 2 and serves to wind the spring motor spring in the well known manner. The free end of this electric motor casing is yieldingly supported from a laterally extended arm 28 of the frame through a flexible connection 29 of leather or other suitable material.

A loop 30 is formed in the motor frame, bounded by the horizontal and vertical members 9, 31, 32 and 33. The lower end of the inclined governor shaft 7 is mounted in suitable bearings in the lug 34 on the vertical member 32 on one side of the frame, and the upper end of this governor shaft is mounted in suitable bearings in the lateral lug 35 on the other side of the frame. Two housing members 36, 37 for the governor are provided upon opposite sides of the motor frame, both of which members are herein shown as being removably secured in position by the fastening screws 38, 39.

The turn table shaft 5 is provided with a gear 40 which meshes with a worm 41 on the governor shaft 7. This governor shaft is also provided with the usual brake disc 42 and the brake handle 43 for controlling the speed of the governor.

It will be noted that the gear 40 and worm 26 are located on the vertically arranged turn table shaft 5 between the upper and lower bearings for said shaft in the motor frame, the upper end of the shaft being projected through the support 13 into position to receive the turn table 44.

From the above description it will be seen that all of the working parts are enclosed and that the said parts are readily accessible for examination, replacement or repair. It will furthermore be seen that a very simple integral frame for supporting the parts is provided. Furthermore, the three point suspension for the device provides a very rigid mounting for the parts and the parts are well balanced by the provision of the spring motor upon one side of the frame and the electric motor upon the other side of the frame with the governor located in the frame between the winding motor and starting motor.

It is evident that various changes might be resorted to in the construction, form and arrangement of the several parts without departing from the spirit and scope of my invention; hence I do not wish to limit myself strictly to the embodiment herein shown and described, but

What I claim is:

1. In a device of the character described, a suitable support, a frame, means for securing the frame to the support at two points, a spring enclosing casing, and means carried by the casing for securing the frame to the support at a third point offset from the other two points.

2. In a device of the character described, a suitable support, a pendent frame, means for securing the frame to the underside of the support at two points, a spring enclosing casing, and means carried by the casing for securing the frame to the underside of the support at a third point offset from the other two points.

3. In a device of the character described, a vertically disposed frame, a spring motor, its horizontally disposed shaft, a vertically disposed driven shaft, a geared connection between the two shafts, and an oil containing casing removably secured to the frame and enclosing the motor and said geared connection.

4. In a device of the character described, a vertically disposed frame, a spring motor, its horizontally disposed shaft, a vertically disposed driven shaft, a geared connection between the two shafts, and an oil containing casing removably secured to the frame and enclosing the motor and said geared connection, said motor shaft being mounted in bearings in the frame and outer end of the casing.

5. In a device of the character described, a vertically disposed frame, a spring motor, its horizontally disposed shaft, a vertically disposed driven shaft, a geared connection between the two shafts, an oil containing casing removably secured to the supporting frame and enclosing the motor and said geared connection, said motor shaft being mounted in bearings in the frame and outer end of the casing, and said driven shaft being mounted in the frame above and below said geared connection.

6. In a device of the character described, a frame disposed in a substantially vertical plane, a spring motor mounted at one side of the frame, a winding motor mounted on the other side of the frame, and a governor mounted in the frame between the two motors.

7. In a device of the character described, a frame disposed in a substantially vertical plane, a spring motor mounted at one side of the frame, a winding motor mounted on the other side of the frame, a governor mounted in the frame between the two motors, and an oil containing casing enclosing the spring motor.

8. In a device of the character described, a frame, a spring motor mounted at one side of the frame, a winding motor mounted on the other side of the frame, a governor mounted in the frame between the two motors, and an oil containing casing enclosing the spring motor, removably secured to one side of the frame.

9. In a device of the character described, a frame, a spring motor mounted at one side of the frame, a winding motor mounted on the other side of the frame, a governor mounted in the frame between the two motors, an oil containing casing enclosing the spring motor, removably secured to one side of the frame, and a housing for the governor.

10. In a device of the character described, a frame disposed in a substantially vertical plane, a spring motor mounted at one side of the frame, a governor mounted in the frame, and a housing for the governor.

11. In a device of the character described, a frame, a spring motor mounted at one side of the frame, a governor mounted in the frame, and a housing for the governor having a member removably secured to one side of the frame.

12. In a device of the character described, a frame, a spring motor mounted at one side of the frame, a governor mounted in the frame, and a housing for the governor having members removably secured to the opposite sides of the frame.

13. In a device of the character described, a frame, a spring motor having its shaft mounted in the frame, a winding motor mounted on the spring motor shaft, and a support carried by the frame for the free end of the winding motor.

14. In a device of the character described, a frame, a spring motor having its shaft mounted in the frame, a winding motor mounted on the spring motor shaft, and a yielding support carried by the frame for the free end of the winding motor.

15. In a device of the character described, an integral vertically disposed frame, a spring motor, its horizontally disposed shaft mounted in the frame, a vertically disposed driven shaft mounted in the frame, and a governor shaft also mounted in the frame.

16. In a device of the character described, an integral vertically disposed frame having a loop, a spring motor, its horizontally disposed shaft, a vertically disposed driven shaft, a governor located in said loop, and a governor shaft, said shafts being all mounted in the frame.

17. In a device of the character described, an integral vertically disposed frame having a loop, a spring motor, its horizontally disposed shaft, a vertically disposed driven shaft, a governor located in said loop, a governor shaft, said shafts being all mounted in the frame, a housing enclosing the governor, and an oil containing casing enclosing the motor.

18. In a device of the character described, an integral frame disposed in a substantially vertical plane and having a loop, and a governor located in said loop, the ends of the governor shaft being mounted in suitable bearings upon opposite sides of the frame adjacent to said loop.

19. In a device of the character described, an integral frame disposed in a substantially vertical plane and having a loop and provided with lugs on opposite sides of the frame adjacent to said loop, and a governor located in said loop, the ends of the governor shaft being mounted in said lugs.

In testimony, that I claim the foregoing as my invention, I have signed my name this 18th day of June, 1920.

JOSEPH W. JONES.